(12) United States Patent
Vaarno et al.

(10) Patent No.: US 9,631,254 B2
(45) Date of Patent: *Apr. 25, 2017

(54) SOLVENT EXTRACTION METHOD AND SOLVENT EXTRACTION SETTLER

(71) Applicant: OUTOTEC (FINLAND) OY, Espoo (FI)

(72) Inventors: Jussi Vaarno, Sundsberg (FI); Rami Saario, Espoo (FI); Henri Fredriksson, Helsinki (FI); Jussi Pajala, Vantaa (FI)

(73) Assignee: Outotec (Finland) Oy, Espoo (FI)

( * ) Notice: Subject to any disclaimer, the term of this patent is extended or adjusted under 35 U.S.C. 154(b) by 62 days.

This patent is subject to a terminal disclaimer.

(21) Appl. No.: 14/408,711

(22) PCT Filed: Jun. 12, 2013

(86) PCT No.: PCT/FI2013/050641
§ 371 (c)(1),
(2) Date: Dec. 17, 2014

(87) PCT Pub. No.: WO2014/001623
PCT Pub. Date: Jan. 3, 2014

(65) Prior Publication Data
US 2015/0232960 A1    Aug. 20, 2015

(30) Foreign Application Priority Data

Jun. 26, 2012  (FI) ...................................... 20125718

(51) Int. Cl.
*C22B 3/02* (2006.01)
*B01D 11/04* (2006.01)
(Continued)

(52) U.S. Cl.
CPC ............ *C22B 3/02* (2013.01); *B01D 11/0453* (2013.01); *B01D 17/0208* (2013.01); *C22B 3/22* (2013.01)

(58) Field of Classification Search
CPC ............ B01D 11/0446; B01D 11/0449; B01D 11/0453; B01D 17/0208; B01D 17/0211; B01D 21/0045; C22B 3/02; C22B 3/22
(Continued)

(56) References Cited

U.S. PATENT DOCUMENTS 2,258,982 A * 10/1941 Gordon ................ B01D 11/043
210/511
2,728,457 A * 12/1955 Clarke ............... B01D 11/0453
210/521

(Continued)

FOREIGN PATENT DOCUMENTS

CN    1216932 A    5/1999
CN    1216933 A    5/1999
(Continued)

OTHER PUBLICATIONS

Intellectual Property Office of the People's Republic of China; First Office Action issued in application No. 201380034064.7; Nov. 3, 2015; 7 pages; Beijing, China.
(Continued)

*Primary Examiner* — Christopher Upton
(74) *Attorney, Agent, or Firm* — Chernoff, Vilhauer, McClung & Stenzel, LLP

(57) ABSTRACT

A solvent extraction method for hydrometallurgical liquid-liquid extraction processes, in which method solution phases are separated from a dispersion while the dispersion flows horizontally in a settler from a feed end to a discharge end. The mass flow of the dispersion and solution phases is divided into a plurality of parallel and mutually separated plug flows flowing in the settler from the feed end to the discharge end. The settler (1) comprises a plurality of elongated settler sections (4) which are mutually separated and side by side in parallel to each other, Inc settler sections (4) extending from the feed end (2) to the discharge end (3),
(Continued)

forming a plurality of mutually separated parallel plug flow channels.

8 Claims, 5 Drawing Sheets

(51) Int. Cl.
  *B01D 17/025* (2006.01)
  *C22B 3/22* (2006.01)
  *B01D 17/02* (2006.01)

(58) Field of Classification Search
  USPC .............. 210/634, 800, 511, 521, 532.1, 540
  See application file for complete search history.

(56) References Cited

U.S. PATENT DOCUMENTS

| | | | |
|---|---|---|---|
| 2,868,384 A * | 1/1959 | Puddington | B01D 21/0045 210/521 |
| 3,419,145 A * | 12/1968 | De Celis | B01D 17/0211 210/519 |
| 3,544,079 A | 12/1970 | Dressler | |
| 4,218,311 A | 8/1980 | Newrick | |
| 4,294,702 A | 10/1981 | Finsterwalder | |
| 4,476,018 A | 10/1984 | White et al. | |
| 4,747,948 A * | 5/1988 | North | B01D 11/0453 210/521 |
| 5,103,641 A | 4/1992 | Maus et al. | |
| 5,185,081 A | 2/1993 | Nyman et al. | |
| 5,266,191 A * | 11/1993 | Greene | B01D 17/0211 210/521 |
| 5,435,924 A | 7/1995 | Albertson | |
| 5,552,050 A | 9/1996 | Valentin | |
| 5,558,780 A | 9/1996 | Vancas | |
| 5,585,008 A | 12/1996 | Ilg et al. | |
| 5,662,861 A | 9/1997 | Taylor | |
| 5,662,871 A | 9/1997 | Nyman et al. | |
| 6,083,400 A | 7/2000 | Nyman et al. | |
| 6,132,615 A | 10/2000 | Nyman et al. | |
| 6,176,608 B1 | 1/2001 | Nyman et al. | |
| 6,245,243 B1 | 6/2001 | Meurer | |
| 6,267,900 B1 | 7/2001 | Nyman et al. | |
| 6,432,370 B1 | 8/2002 | Nyman et al. | |
| 6,558,558 B1 * | 5/2003 | Hall | B01D 17/0211 210/521 |
| 7,390,420 B2 * | 6/2008 | Nyman | B01D 11/0446 210/511 |
| 7,507,343 B2 | 3/2009 | San Lorenzo et al. | |
| 7,517,461 B2 | 4/2009 | Nyman et al. | |
| 7,611,635 B2 * | 11/2009 | Chieng | B01D 17/0208 210/800 |
| 7,731,853 B2 | 6/2010 | Ekman et al. | |
| 2005/0040106 A1 | 2/2005 | Gigas et al. | |
| 2006/0113246 A1 | 6/2006 | Ekman et al. | |
| 2007/0263486 A1 | 11/2007 | Suhner | |
| 2010/0051548 A1 | 3/2010 | Dorlac et al. | |
| 2011/0236152 A1 | 9/2011 | Lu et al. | |
| 2011/0297606 A1 | 12/2011 | Vaarno | |
| 2011/0303619 A1 | 12/2011 | Nyman et al. | |
| 2014/0110359 A1 | 4/2014 | Haywood et al. | |
| 2015/0151218 A1 * | 6/2015 | Vaarno | B01D 11/0446 210/322 |
| 2015/0151460 A1 | 6/2015 | Saario et al. | |
| 2015/0159236 A1 * | 6/2015 | Vaarno | B01D 11/0446 266/170 |
| 2015/0182874 A1 * | 7/2015 | Vaarno | B01D 11/0446 266/170 |
| 2015/0190732 A1 * | 7/2015 | Vaarno | C22B 3/22 266/170 |
| 2015/0190734 A1 * | 7/2015 | Vaarno | C22B 3/02 210/532.1 |
| 2015/0232960 A1 | 8/2015 | Vaarno et al. | |
| 2016/0130681 A1 * | 5/2016 | Vaarno | B01D 11/0446 210/511 |

FOREIGN PATENT DOCUMENTS

| | | |
|---|---|---|
| CN | 2480439 | 3/2002 |
| CN | 1652853 A | 8/2005 |
| CN | 1652855 A | 8/2005 |
| CN | 2748146 Y | 12/2005 |
| CN | 1805773 A | 7/2006 |
| CN | 201071566 Y | 6/2008 |
| CN | 101449012 B | 6/2009 |
| CN | 201366254 Y | 12/2009 |
| CN | 102292133 A | 12/2011 |
| CN | 202128943 Y | 2/2012 |
| DE | 3704326 A1 | 8/1988 |
| EP | 0156699 A1 | 10/1985 |
| EP | 0 973 595 * | 8/1999 |
| EP | 2019890 A1 | 2/2009 |
| EP | 2114548 A2 | 11/2011 |
| GB | 335912 | 5/1960 |
| GB | 2476102 A | 6/2011 |
| JP | 2001029703 | 2/2001 |
| WO | 9740899 | 11/1997 |
| WO | 9740900 | 11/1997 |
| WO | 9740901 A1 | 11/1997 |
| WO | 9741938 | 11/1997 |
| WO | 0074895 A1 | 12/2000 |
| WO | 2007135221 | 11/2007 |
| WO | 2008094151 A1 | 8/2008 |
| WO | 2009004321 A2 | 1/2009 |
| WO | 2009063128 | 5/2009 |
| WO | 2010089462 A1 | 8/2010 |
| WO | 2010097516 A1 | 9/2010 |
| WO | 2010131982 A2 | 11/2010 |
| WO | 2011113110 A1 | 6/2011 |
| WO | 2011088516 A1 | 7/2011 |
| WO | 2012026345 A1 | 3/2012 |

OTHER PUBLICATIONS

The International Bureau of WIPO, International Preliminary Report on Patentability w/ attached Written Opinion of the International Searching Authority, issued in pending PCT application No. PCT/FI2013/050641, Dec. 31, 2014, 7 pages, World Intellectual Property Organization, Geneva, Switzerland.

European Patent Office, Extended European Search Report issued in application No. 13808497, Feb. 11, 2016, 9 pages, European Patent Office, Munich, Germany.

Miller, Graeme, "Design of Mixer-Settlers to Maximize Performance", Miller Metallurgical Services, ALTA COPPER-10, May 2006, 26 pgs.

Finnish Search report from priority Finnish Application No. 20125718, dated Apr. 19, 2013, 1 pg.

International Search report from corresponding International Application No. PCT/FI2013/050641, mailed Sep. 17, 2013, 3 pgs.

United States Patent and Trademark Office, Office action issued in U.S. Appl. No. 14/407,187, Jun. 14, 2016, 8 pages, USPTO, Alexandria, VA.

United States Patent and Trademark Office, Office action issued in U.S. Appl. No. 14/408,703, Jun. 14, 2016, 9 pages, USPTO, Alexandria, VA.

Canadian Intellectual Property Office; Office Action issued in Application No. 2,875,939; Sep. 15, 2015; 4 pgs.; Montreal, Quebec, Canada.

European Patent Office, Extended European Search Report issued in application No. 13810173.8, Mar. 17, 2016, Munich, Germany.

European Patent Office; Extended European Search Report issued in application No. 13810718.0; Mar. 7, 2016; 6 pages; Munich, Germany.

European Patent Office, Extended European Search Report issued in application No. 13809197.0, Mar. 21, 2016, 9 pages, Munich, Germany.

European Patent Office; Extended European Search Report issued in application No. 13809503.9; Mar. 17, 2016; 6 pages; Munich, Germany.

(56) References Cited

OTHER PUBLICATIONS

European Patent Office; Partial Supplementary European Search Report issued in application No. 13810326.2; Apr. 25, 2016; 6 pages; Munich, Germany.
Finnish Search report from priority Finnish Application No. 20125712, dated Apr. 8, 2013, 1 pg.
Finnish Search report from priority Finnish Application No. 20125714, dated Apr. 8, 2013., 1 pg.
Finnish Search report from priority Finnish Application No. 20125715, dated Apr. 16, 2013, 1 pg.
Finnish Search report from priority Finnish Application No. 20125717, dated Apr. 19, 2013, 1 pg.
Finnish Patent and Registration Office, Opinion on Patentability issued in Application No. 20125714, Jan. 21, 2016, Helsinki, Finland.
International Bureau of WIPO, International Preliminary Report on Patentability issued in application No. PCT/FI2013/050640, Dec. 31, 2014, Geneva, Switzerland.
International Searching Authority of WIPO, Written Opinion of the International Searching Authority issued in application No. PCT/FI2013/050640, Sep. 20, 2013, Geneva, Switzerland.
International Bureau of WIPO, International Preliminary Report on Patentability w/ attached Written Opinion of the International Searching Authority, issued in pending PCT application PCT/FI2013/050638, Dec. 31, 2014, 6 pages, World Intellectual Property Organization, Geneva, Switzerland.
International Search report from corresponding International Application No. PCT/FI2013/050637, mailed Oct. 9, 2013, 3 pgs.
International Search report from corresponding International Application No. PCT/FI2013/050638, mailed Sep. 20, 2013, 3 pgs.
International Search report from corresponding International Application No. PCT/FI2013/050639; mailed Nov. 27, 2013, 6 pgs.
International Search report from corresponding International Application No. PCT/FI2013/050640, mailed Sep. 30, 2013, 3 pgs.
Plastic Moulding Process, Jiang Shui Qing, Li Hai Ling, Chemical Industry Publishing House, Aug. 31, 2009, pp. 172-173, Figs. 9-11.
R.J. Crawford and M.P. Kearns, Queens' University, Belfast, Introduction to the Rotational Moulding Process:, Practical Guide to Rotational Moulding, 2003, Chapter 1.
State Intellectual Property Office of the People's Republic of China; Notification of First Office Action issued in application No. 201380037892.6; Aug. 31, 2015, Beijing, China.
State Intellectual Property Office of the People's Republic of China, Office Action issued in Application No. 201380034067.0, Mar. 3, 2016, 7 Pages, Beijing, China.
State Intellectual Property Office of the People's Republic of China; First Office Action issued in application No. 201380037899.8; Oct. 29, 2015; 5 pages; Beijing, China.
State Intellectual Property Office of the People's Republic of China; Notification of First Office Action issued in Application No. 201380034124.5; Dec. 16, 2015; 15 pages; Beijing, China.
State Intellectual Property Office of the People's Republic of China, Office action issued in application No. 201380037888.X, Dec. 3, 2015, 6 pages, Beijing, China.
Taylor, Alan and Jansen, Malcolm L., "Solvent Extraction Mixer-Settler Design", Intl. Project Dev. Services Ltd., ALTA Free Paper, 10 pgs.
State Intellectual Property Office of the People's Republic of China, Notification of the Second Office Action issued in Application No. 201380034064.7, Aug. 15, 2016, 16 pages, Beijing, China.
European Patent Office; Extended European Search Report, issued in European Application No. 13810326.2, dated Sep. 29, 2016; 11 pages; Helsinki, Finland.

\* cited by examiner

SOLVENT EXTRACTION METHOD AND SOLVENT EXTRACTION SETTLER

This is a national stage application filed under 35 USC 371 based on International Application No. PCT/FI2013/050641, filed Jun. 12, 2013 and claims priority under 35 USC 119 of Finnish Patent Application No. 20125718 filed Jun. 26, 2012.

FIELD OF THE INVENTION

The present invention relates to a solvent extraction method for hydrometallurgical liquid-liquid extraction processes. In the method solution phases are separated from a dispersion while the dispersion flows horizontally in a settler from a feed end to a discharge end. Further, the present invention relates to a solvent extraction settler configured to perform hydrometallurgical liquid-liquid extraction processes, the settler being arranged to separate solution phases from a dispersion while it flows horizontally from the feed end towards the discharge end.

BACKGROUND OF THE INVENTION

In a typical mixer-settler, in the first step, the aqueous and organic phases are pumped into a mixer or mixers in order to achieve a uniform liquid-liquid dispersion and a small droplet size. After mixing, the dispersion is fed into a settler. The settler is typically a large tank which is square in plan and its square area is about several hundred square meters. Dispersion is fed into the settler at the feed end of the settler. A distributor fence is arranged adjacent to the feed end of the settler to distribute the flow of the dispersion to the whole width of the settler. In the settler, the dispersion moves towards the settler discharge end and, at the same time, the phases separate by gravity into two layers with a dispersion band remaining between them.

The settler tank is normally built on the site. WO 2007/135221 A1 discloses one method for manufacturing a mixer-settler on the site. Wall structures are connected by vertical support columns to the bottom plate. The wall structure is formed by fastening a required number of horizontal support beams to the vertical support columns at regular intervals. A required number of plate-like wall elements made of a chemically resistant material are attached to the horizontal support beams inside the mixer-settler, so that they form a load-bearing structure in the spaces left between the horizontal support beams. The plate-like wall elements are connected to the plate-like element covering the bottom plate of the mixer-settler. However, as mentioned, such a settler is still a large tank which is square in plan and its square area is about several hundred square meters.

A conventional solvent extraction settler has some disadvantages. In a large settler tank, transverse flow patterns may exist, slowing down the coalescence in the dispersion. The specific area of the wall surfaces is small, whereby the advantageous wall effect is minimal and the coalescence is slow. Maintenance of the settler requires shutting down the whole solvent extraction process because it is not possible to perform maintenance operations, e.g. for the removal of accumulated crud, while the process is running. Further, the capacity of the settler cannot be increased easily. The process cannot be run with only a part of its capacity. The atmosphere above the liquid surface in the settler is flammable because it contains volatile organic compounds which are released from the hydrocarbon based solvents. Fire protection in a conventional settler is also difficult because the fire compartment in which the fire may ignite has an area which is as large as that of the whole settler. If leakage occurs in the settler tank, the amount of damages can be very large.

OBJECT OF THE INVENTION

The object of the invention is to eliminate the disadvantages mentioned above.

In particular, it is the object of the invention to provide a method and a settler which enable to increase the specific surface area to enhance coalescence in the dispersion.

Further, it is the object of the invention to provide a method and a settler which enable effectively to prevent transverse flow patterns in the settler so that the flow pattern can be a plug flow pattern.

Further, it is the object of the invention to provide a method and a settler which enable a part of the settler to be isolated from the process to enable maintenance of that part while the process is running and to enable the full utilization degree.

Further, it is the object of the invention to provide a method and a settler which enable easy increasing of the settler capacity.

Further, it is the object of the invention to provide a method and a settler which enable running the process with part of the settler capacity.

Further, it is the object of the invention to provide a method and a settler which enable improving the fire protection of the settler.

Further, it is the object of the invention to provide a method and a settler which enable to limit damages caused by a leakage in the event of the settler being punctured.

SUMMARY OF THE INVENTION

According to a first aspect of the invention, the present invention provides a solvent extraction method for hydrometallurgical liquid-liquid extraction processes, in which method solution phases are separated from a dispersion while the dispersion flows horizontally in a settler from a feed end to a discharge end. In accordance with the invention the mass flow of the dispersion and solution phases is divided into a plurality of parallel and mutually separated plug flows flowing in the settler from the feed end to the discharge end.

According to a second aspect of the invention, the present invention provides a solvent extraction settler configured to perform hydrometallurgical liquid-liquid extraction processes, the settler having a feed end and a discharge end, said settler being arranged to separate solution phases from a dispersion while the dispersion flows horizontally from the feed end towards the discharge end. In accordance with the invention the settler comprises a plurality of elongated settler sections which are mutually separated and side by side in parallel to each other, the settler sections extending from the feed end to the discharge end, forming a plurality of mutually separated parallel plug flow channels.

The advantage of the invention is that the multi-section settler provides a large specific surface area. This enhances the wall effect which enhances coalescence in the dispersion. Further, the advantage of the invention is that, in the settler sections, a plug flow pattern is formed and transverse flow pattern formation is avoided, thereby enhancing coalescence in the dispersion. Further, the advantage of the invention is that a part of the settler can be isolated from the process to enable maintenance of that part while the process is running and enables the full utilization degree. Further, the advantage of the invention is that the settler capacity can be easily increased by adding additional settler sections. Further, the advantage of the invention is that the process can be run with part of the settler capacity. Further, the advantage of the invention is that fire protection of the settler is increased. Each settler section can be made to form a fire compartment which is isolated from the others, whereby extinguishing of the fire is easy. Further, the advantage of the invention is that due to the compartmentation provided by the settler sections the amount of damages can be limited in the event of leakage.

In one embodiment of the settler, the settler comprises a plurality of feed inlets. One feed inlet is arranged to feed dispersion individually to each settler section.

In one embodiment of the settler, the settler sections are formed of tubular shells.

In one embodiment of the settler, the settler comprises a bottom, a vertical feed end wall at the feed end, a vertical discharge end wall at the discharge end, and vertical side walls extending between the ends of the feed end wall and the discharge end wall, said bottom and walls forming a rectangular tank having an inner space. A plurality of partitions are arranged in parallel in the tank at a distance from each other to extend between the feed end wall and the discharge end wall so that the inner space is divided by said partitions into the settler sections.

In one embodiment of the settler, the partitions are rigid structures.

In one embodiment of the settler, the partitions are flexible material, such as tarp walls.

In one embodiment of the settler, the settler comprises a plurality of separate chutes arranged side by side in parallel to each other, said chutes forming said settler sections, each chute comprising a bottom and vertical side walls.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
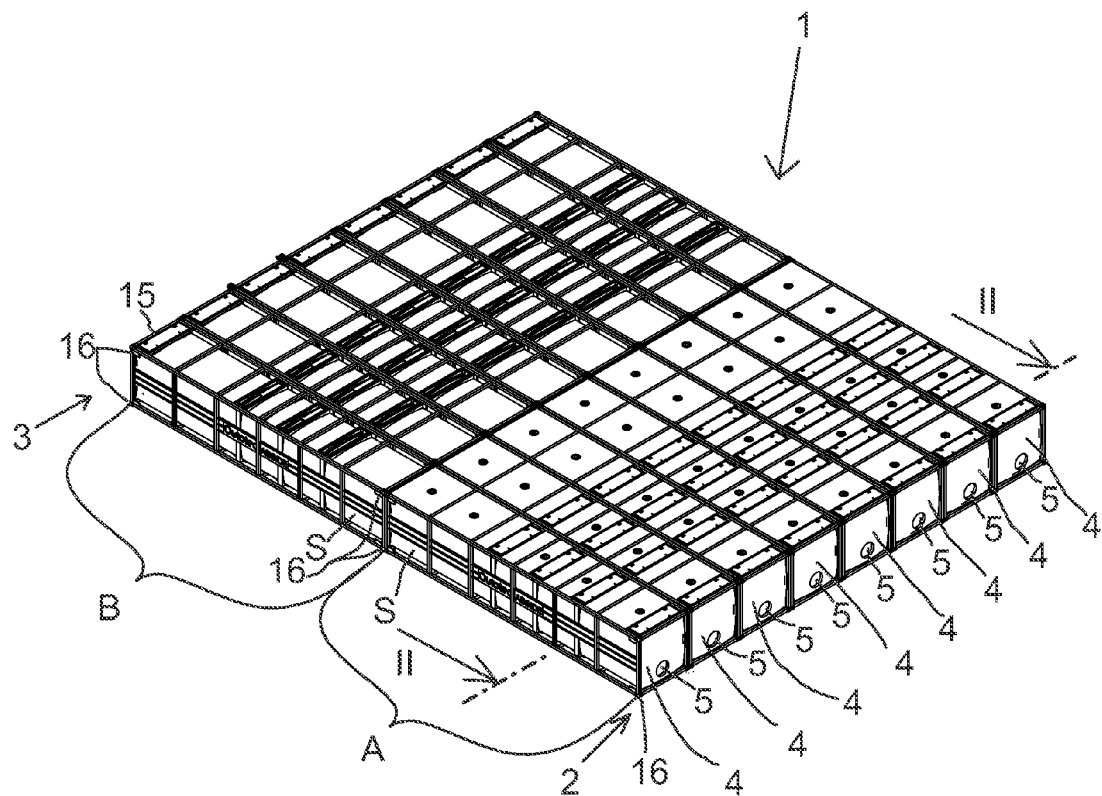
FIG. 1 is an axonometric view of a solvent extraction settler according to a first embodiment of the present invention.

FIGS. 1 to 10 show different embodiments of a solvent extraction settler 1 to be used in hydrometallurgical liquid-liquid extraction processes for separating solutions which have been mixed in a dispersion into different solution phases. The figures show only the settler 1. The mixing unit which prepares the dispersion, the feeding device which feeds the dispersion to the settler and the discharge launders which discharge the separated solution phases are not shown in the Figures because they are not the object of this invention.

In each embodiment of FIGS. 1 to 10 the settler 1 comprises a plurality of elongated settler sections 4 which are mutually separated and arranged side by side 30 in parallel to each other. The settler sections 4 extend from the feed end 2 of the settler to the discharge end 3 of the settler. The settler sections 4 form a plurality of mutually separated parallel plug flow channels. In operation, the dispersion and solutions form a plug flow pattern in these plug flow channels. The settler 1 comprises a plurality of feed inlets 5 at the feed end 2 of the settler 1. Each feed inlet 5 feeds dispersion to a specific single settler section 4. By dividing the flow into several sub-flows which flow in separate settler sections 4, a large specific surface area is created which enhances coalescence in the dispersion.

In the embodiments of FIGS. 1, 2 and 3, 4 the settler sections 4 are formed of tubular shells S. Tubular shells S can be made gas-tight. The gas-tight closed compartments of the tubular shells provide fire protection against accidental fires. Mist emissions cannot escape from the atmosphere in the interior of the gas-tight shells to the outer atmosphere to contaminate the air and worsen the working conditions. Likewise, the surrounding air and e.g. insects and birds cannot enter the shells. In addition, when the lighter solution is an organic phase, the oxidation degree of the organic phase decreases, whereby solution costs are reduced.

Figure 2:
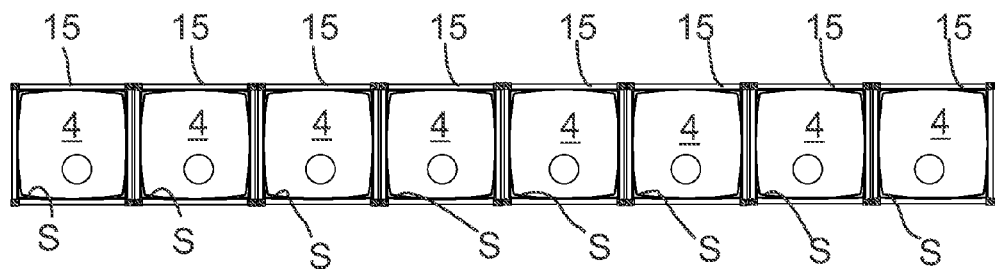
FIG. 2 shows a section II-II from FIG. 1.

FIGS. 1 and 2 show a settler 1 having eight settler sections 4 arranged side by side in parallel to each other. Each settler section 4 is formed of the tubular shells S of two self-supporting settler element modules A and B which are consecutively interconnected. The first settler element module A is a coalescing module having one or more coalescing fence elements to coalesce the dispersion into different solution phases. The second settler element module B is a retention module to increase residence time in the settler for enhancing the phase separation.

Each of the settler element modules A, B has exterior dimensions, strength and handling and securing means which conform to shipping container standards to enable shipping standard compatible transportability. In particular, each settler element module A, B comprises a self-supporting framework structure 15 having a shape of a rectangular parallelepiped with exterior dimensions and corner fittings 16 conforming to shipping container standards. The corner fittings 16 are attached to each eight corners of the framework structure 15. Preferably, each module A, B conforms to standard ISO 668 Series 1 "Freight containers—Classification, dimensions and ratings". The corner fittings 16 conform to standard ISO 1161 Series 1 "Freight containers—Corner fittings—specification".

The tubular shells S are preferably made of a fibre-reinforced plastic composite and are supported inside the framework structure 15. Preferably the tubular shell S is made by filament winding technology. The inner surface of the shell S, which in operation comes to contact with the dispersion and solvents, is inherently smooth because when manufactured by filament winding it is formed against a mandrel which has a smooth surface. The smooth surface contacting the solvent flow minimizes local turbulences and enhances phase coalescence. The smooth surface also minimizes electrostatic charging and thereby reduces the risk for fires due to igniting of volatile organic compounds in the inner atmosphere of the shell caused by electrostatic discharge. Electrostatic charging can also be reduced by adding carbon staple fibers to the plastic composite.

As can be seen in FIG. 2, the tubular shells S of the coalescing module A and the retention module B have a substantially rectangular cross-sectional shape with cambered corners and convexly outwards curved side walls. The cross-section of the shells S of the coalescing module A is equal to the cross section of the shells S of the retention module B to enable abutting joint of the shells S.

Figure 3:
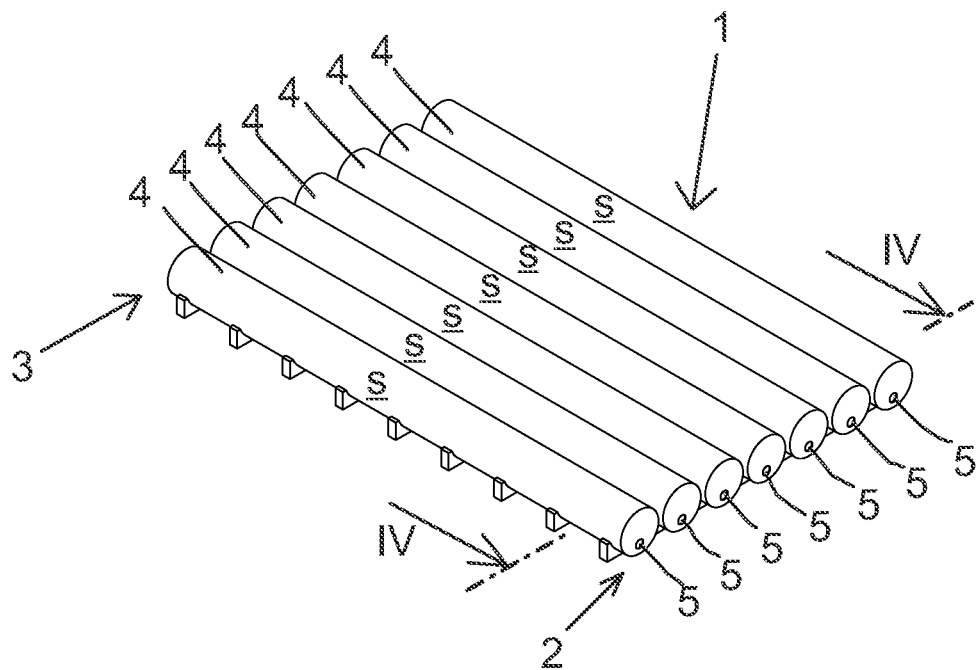
FIG. 3 is an axonometric view of a solvent extraction settler according to a second embodiment of the present invention.
Figure 4:
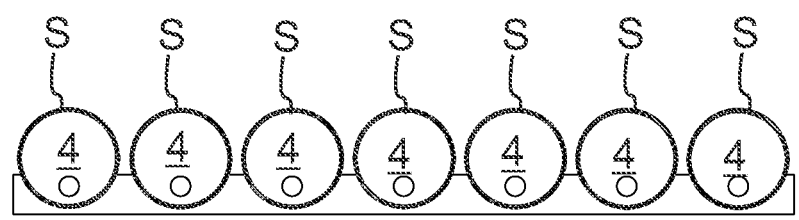
FIG. 4 shows a section IV-IV from FIG. 3.

FIGS. 3 and 4 show an embodiment of the settler 1 which has seven elongated settler sections 4 which are mutually separated and side by side in parallel to each other. The settler sections 4 extend from the feed end 2 to the discharge end 3 and form seven mutually separated parallel plug flow channels. The settler sections 4 are formed of tubular shells S having a circular cross-section.

FIGS. 5, 6 and 7, 8 show two embodiments of settlers 1 which both comprise a bottom 6, a vertical feed end wall 7 at the feed end 2, a vertical discharge end wall 8 at the discharge end 3, and vertical side walls 9, 10 extending between the ends of the feed end wall and the discharge end wall. The bottom 6 and walls 7, 8, 9, 10 form a rectangular tank having an inner space. Seven partitions 11 are arranged in parallel in the tank at a distance from each other to extend between the feed end wall 7 and the discharge end wall 8 so that the inner space is divided by said partitions into eight settler sections 4.

Figure 5:
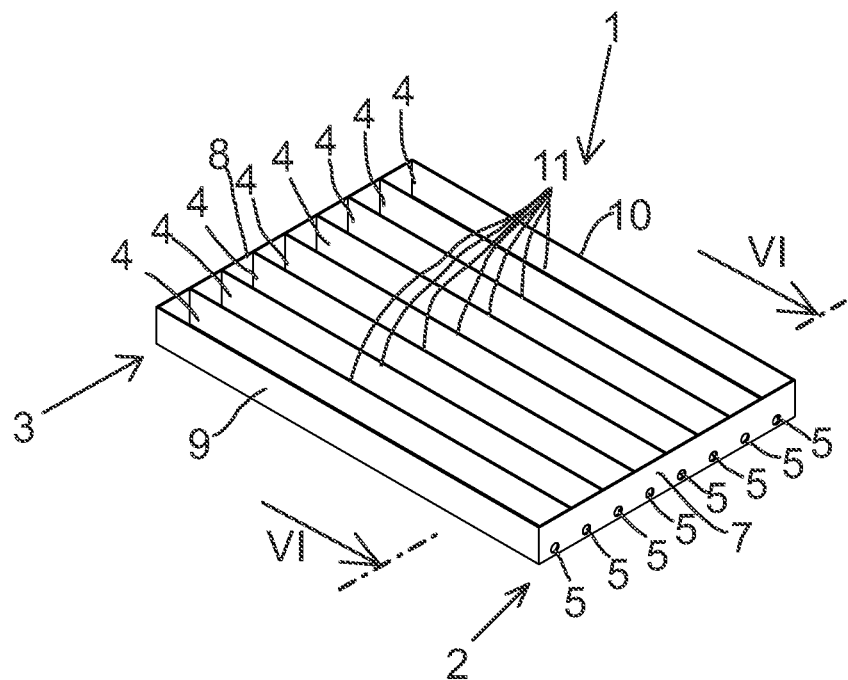
FIG. 5 is an axonometric view of a solvent extraction settler according to a third embodiment of the present invention, FIG. 6 a section VI-VI from FIG. 5.
Figure 6:
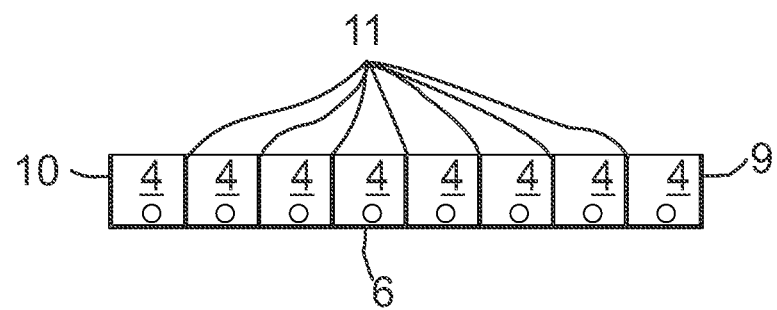

In the settler 1 of FIGS. 5 and 6 the partitions 11 are rigid structures, such as midwalls made of a plastic composite, metal or any other suitable rigid material.

Figure 7:
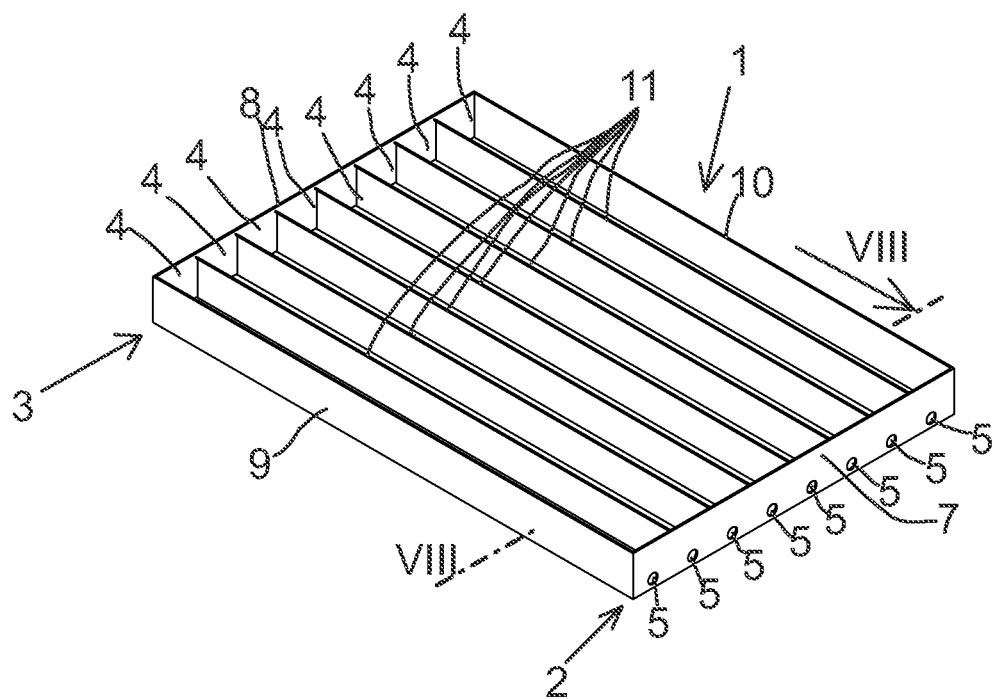
FIG. 7 is an axonometric view of a solvent extraction settler according to a fourth embodiment of the present invention.
Figure 8:
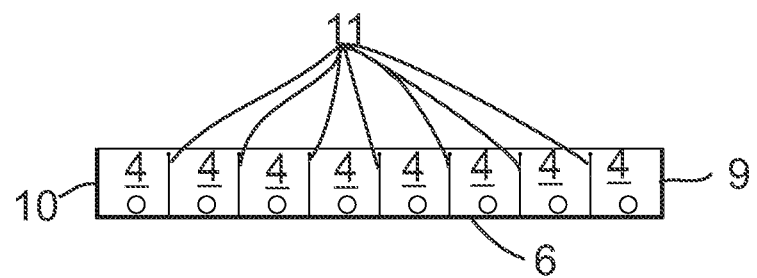
FIG. 8 is a section VIII-VIII from FIG. 7.

In the settler 1 of FIGS. 7 and 8 the partitions 11 are made of a flexible material, such as tarp fabric, and act as flow guides in the tank to form said mutually separated plug flow channels.

Figure 9:
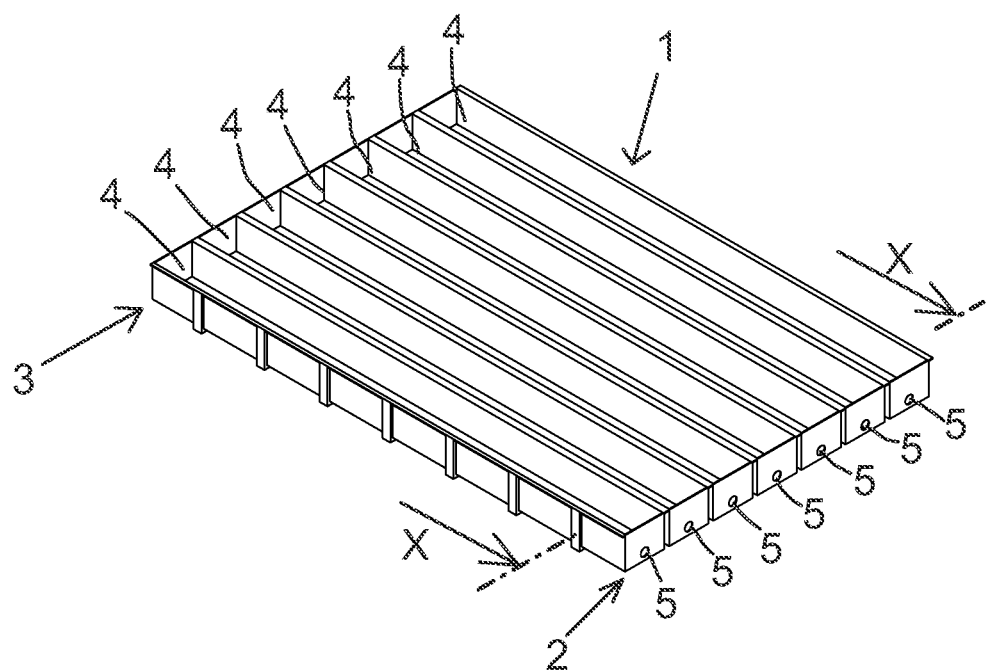
FIG. 9 is an axonometric view of a solvent extraction settler according to a fifth embodiment of the present invention.
Figure 10:
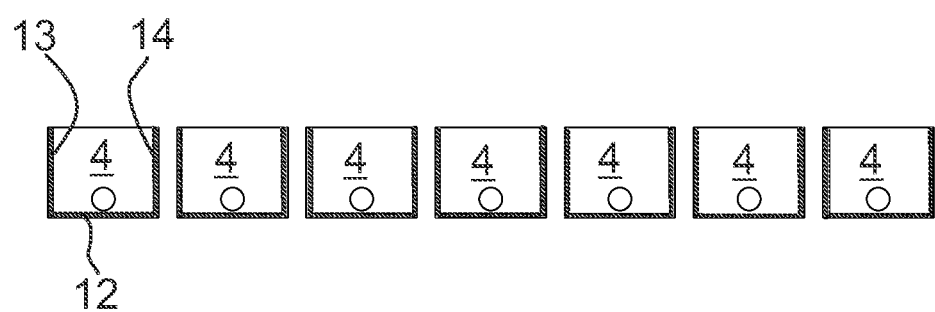
FIG. 10 is a section X-X from FIG. 9.

FIGS. 9 and 10 show a settler 1 which comprises a plurality of separate chutes 4 or launders arranged side by side and in parallel to each other. The chutes form the settler sections 4. Each chute 4 comprises a bottom 12 and vertical side walls 13, 14.

It is obvious to a person skilled in the art that with the advancement of technology, the basic idea of the invention may be implemented in various ways. The invention and its embodiments are thus not limited to the examples described above; instead, they may vary within the scope of the claims.

The invention claimed is:

1. A solvent extraction method for hydrometallurgical liquid-liquid extraction processes, in which method solution phases are separated from a dispersion while the dispersion flows horizontally in a settler from a feed end to a discharge end, characterized in that the mass flow of the dispersion and solution phases is divided into a plurality of parallel and mutually separated plug flows flowing in the settler from the feed end to the discharge end, the settler including two consecutively interconnected first and second settler elements, the first settler element having at least one coalescing member to coalesce the dispersion into different phases and the second settler element comprising a retention module to increase residence time of the dispersion in the settler.

2. A solvent extraction settler configured to perform hydrometallurgical liquid-liquid extraction processes, the settler having a feed end and a discharge end, said settler being arranged to separate solution phases from a dispersion while the dispersion flows horizontally from the feed end towards the discharge end, characterized in that the settler comprises a plurality of elongated settler sections which are mutually separated and side by side in parallel to each other, the settler sections extending from the feed end to the discharge end, forming a plurality of mutually separated parallel plug flow channels, the settler including two consecutively interconnected first and second settler elements, the first settler element having at least one coalescing member to coalesce the dispersion into different chases and the second settler element comprising a retention module to increase residence time of the dispersion in the settler.

3. The settler according to claim 2, where the settler comprises a plurality of feed inlets, and where one feed inlet is arranged to feed dispersion individually to each settler section.

4. The settler according to claim 2, where the settler sections are formed of tubular shells.

5. The settler according to claim 2, where the settler comprises a bottom, a vertical feed end wall at the feed end, a vertical discharge end wall at the discharge end, and vertical side walls extending between the ends of the feed end wall and the discharge end wall, together forming a rectangular tank having an inner space; and where a plurality of partitions are arranged in parallel in the tank at a distance from each other to extend between the feed end wall and the discharge end wall so that the inner space is divided by said partitions into the settler sections.

6. The settler according to claim 5, where the partitions are rigid structures.

7. The settler according to claim 5, where the partitions are flexible.

8. The settler according to claim 2, where the settler comprises a plurality of separate chutes arranged side by side in parallel to each other, said chutes forming said settler sections, each chute comprising a bottom and vertical side walls.

* * * * *

UNITED STATES PATENT AND TRADEMARK OFFICE
CERTIFICATE OF CORRECTION

PATENT NO. : 9,631,254 B2  Page 1 of 1
APPLICATION NO. : 14/408711
DATED : April 25, 2017
INVENTOR(S) : Vaarno et al.

It is certified that error appears in the above-identified patent and that said Letters Patent is hereby corrected as shown below:

In the Claims

At Column 6, Line 23:
"different chases" should read -- different phases --

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*